United States Patent [19]

Kluttz

[11] Patent Number: 5,079,285
[45] Date of Patent: Jan. 7, 1992

[54] STABILIZED COMPOSITIONS

[75] Inventor: Robert Q. Kluttz, Houston, Tex.

[73] Assignee: Shell Oil Company, Houston, Tex.

[21] Appl. No.: 564,207

[22] Filed: Aug. 8, 1990

[51] Int. Cl.$^5$ .............................................. C08K 5/34
[52] U.S. Cl. .................................... 524/106; 524/105
[58] Field of Search ............................... 524/106, 105

[56] References Cited

U.S. PATENT DOCUMENTS

| | | | |
|---|---|---|---|
| 2,458,780 | 1/1949 | Howland | 524/106 |
| 2,495,286 | 1/1950 | Brubaker | 260/63 |
| 2,739,963 | 3/1956 | Marschall et al. | 524/106 |
| 3,325,445 | 6/1967 | Harris et al. | 524/106 |
| 3,694,412 | 7/1972 | Nozaki | 260/63 |
| 4,843,144 | 3/1989 | Van Broekhoven et al. | 528/392 |
| 4,880,903 | 11/1989 | Van Borekhoven et al. | 528/392 |

FOREIGN PATENT DOCUMENTS

| | | |
|---|---|---|
| 121965 | 9/1984 | European Pat. Off. . |
| 181014 | 4/1986 | European Pat. Off. . |
| 213671 | 2/1987 | European Pat. Off. . |
| 257663 | 2/1988 | European Pat. Off. . |
| 1081304 | 8/1967 | United Kingdom . |

*Primary Examiner*—Kriellion S. Morgan
*Attorney, Agent, or Firm*—James O. Okorafor

[57] ABSTRACT

Improved thermal stability is demonstrated by stabilized compositions comprising a linear alternating polymer of carbon monoxide and at least one ethylenically unsaturated hydrocarbon having incorporated therein a stabilizing quantity of a substituted pyrazolinone.

20 Claims, No Drawings

STABILIZED COMPOSITIONS

FIELD OF THE INVENTION

This invention relates to certain stabilized compositions comprising a linear alternating polymer of carbon monoxide and at least one ethylenically unsaturated hydrocarbon. More particularly, the invention relates to such compositions of improved heat stability.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. U.K. 1,081,304 produced similar polymers of higher carbon monoxide content in the presence of alkylphosphines complexes of palladium salts as catalyst. Nozaki extended the reaction to produce linear alternating polymers in the presence of arylphosphine complexes of palladium moieties and certain inert solvents. See, for example, U.S. Pat. No. 3,694,412.

More recently, the class of linear alternating polymers has become of greater interest in part because of the greater availability of the polymers. More recent processes for the production of these linear alternating polymers, now becoming known as polyketones or polyketone polymers, are illustrated by a number of published European Patent Applications of which 121,965, 181,014, 213,671 and 257,663 are illustrative. The process, now considered broadly conventional, typically includes the use of a catalyst formed from a Group VIII metal selected from palladium, cobalt or nickel, the anion of a strong non-hydrohalogenic acid and a bidentate ligand of phosphorus, arsenic, antimony or nitrogen.

The resulting polyketone polymers are relatively high molecular weight materials having established utility as premium thermoplastics in the production of shaped articles by methods conventional for the processing of thermoplastics. Although the polymers are relatively stable, the linear alternating polymers do undergo some loss of desirable properties when exposed to heat for extended periods. It would be of advantage to provide compositions comprising the linear alternating polymers of carbon monoxide and at least one ethylenically unsaturated hydrocarbon which demonstrate an improved heat stability.

SUMMARY OF THE INVENTION

The invention provides certain polymer compositions stabilized against the adverse effect of exposure to elevated temperatures. More particularly, the invention provides stabilized compositions comprising linear alternating polymer of carbon monoxide and at least one ethylenically unsaturated hydrocarbon and incorporated therein a substituted pyrazolinone compound.

DESCRIPTION OF THE INVENTION

The compositions of the invention comprise linear alternating polymer of carbon monoxide and at least one ethylenically unsaturated hydrocarbon stabilized by the incorporation within the polymer of a substituted pyrazolinone compound. The ethylenically unsaturated hydrocarbons useful as precursors of the linear alternating polymer have up to 20 carbon atoms inclusive, preferably up to 10 carbon atoms inclusive, and are aliphatic such as ethylene and other α-olefins including propylene, 1-butene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-propylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred terpolymers of carbon monoxide, ethylene and the second hydrocarbon are employed in the stabilized compositions of the invention, there will be at least two units incorporating a moiety of ethylene for each unit incorporating a moiety of the second hydrocarbon. Preferably, there will be from about 10 units to about 100 units incorporating a moiety of ethylene for each unit incorporating a moiety of the second hydrocarbon. The polymer chain of the preferred polymers is therefore represented by the repeating formula

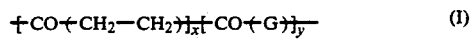

$$\pm CO \pm CH_2 - CH_2 \pm_x \pm CO \pm G \pm_y \qquad (I)$$

wherein G is the moiety of an ethylenically unsaturated hydrocarbon of at least 3 carbon atoms polymerized through the ethylenic unsaturation thereof and the ratio of y:x is no more than about 0.5. When the preferred copolymers are employed in the compositions of the invention there will be no second hydrocarbon present and the copolymers are represented by the above formula I wherein y is zero. When y is other than zero, i.e., terpolymers are employed, the $-CO+CH_2CH_2+$ units and the $-CO+G+$ units are found randomly throughout the polymer chain and the preferred ratios of y:x are from about 0.01 to about 0.1. The end groups or "caps" of the polymer chain will depend upon what materials were present during production of the polymer and whether and how the polymer was purified. The end groups do not appear to influence the properties of the polymer to any significant extent, however, and the polymer is fairly represented by the polymer chain as depicted above.

Of particular importance are the polyketone polymers of number average molecular weight from about 1000 to about 200,000, particularly those of number average molecular weight from about 20,000 to about 90,000, as determined by gel permeation chromatography. The physical properties of the polymer will depend in part upon the molecular weight, whether the polymer is a copolymer or a terpolymer and, in the case of terpolymers, the nature of and the proportion of the second hydrocarbon present. Typical melting points for the polyketone polymers are from about 175° C. to about 300° C., more frequently from about 210° C. to about 275° C. The polymer will have a limiting viscosity number (LVN), measured in m-cresol at 60° C. in a standard capillary viscosity measuring device, of from about 0.4 dl/g to about 10 dl/g, preferably from about 0.8 dl/g to about 4 dl/g.

The process for the production of the polyketone polymers is illustrated by the above published European Patent Applications and a process now becoming broadly conventional is to contact the carbon monoxide and ethylenically unsaturated hydrocarbon in the presence of a catalyst composition formed from a palladium compound, the anion of a non-hydrohalogenic acid having a pKa (measured in water at 18° C.) below 2 and a bidentate ligand of phosphorus. The scope of the polymerization is extensive but, without wishing to be limited, a preferred palladium compound is a palladium alkanoate such as palladium acetate, a preferred anion is the anion of trifluoroacetic acid or p-toluenesulfonic acid and a preferred bidentate ligand of phosphorus is 1,3-bis(diphenylphosphino)-propane or 1,3-bis[di(2-methoxyphenyl)phosphino]propane.

Polymerization is conducted in the liquid phase by contacting the carbon monoxide and hydrocarbon under polymerization conditions in the presence of the catalyst composition and a reaction diluent. Suitable reaction diluents include the lower alkanols, e.g., methanol or ethanol, and methanol is preferred. Typical polymerization conditions include a polymerization temperature from about 30° C. to about 150° C., preferably from about 50° C. to about 135° C. The reaction pressure is usually from about 1 atmosphere to about 200 atmospheres but pressures from about 10 atmospheres to about 100 atmospheres are more often employed. Subsequent to polymerization, reaction is terminated by cooling the reactor and releasing the pressure. The polymer product is customarily obtained as a material substantially insoluble in the reaction diluent and is recovered by conventional methods such as filtration or decantation. The polyketone polymer is used in the compositions of the invention as recovered or may be purified as by contact with a solvent or extraction agent which is selective for catalyst residues.

The polyketone polymer is stabilized according to the invention by the incorporation therein of a substituted pyrazolinone wherein substituents other than hydrogen are located on the nitrogen atom in the 1 position and the carbon atom in the 3 position of the heterocyclic diazacyclopentene ring and the oxo group is located on the carbon atom in the 5 position of the ring. Such materials are 1,3-disubstituted-pyrazolin-5-ones, a preferred group of which is represented by the formula

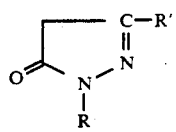 (II)

wherein R is aliphatic or aromatic of up to 10 carbon atoms inclusive and is hydrocarbyl containing only atoms of carbon and hydrogen or is substituted hydrocarbyl containing additional atoms in the form of inert substituents such as halo, preferably chloro, nitro and cyano. In the above formula II R' independently is R or hydrogen. Illustrative R or R' groups include aliphatic groups such as methyl, ethyl, hexyl, decyl, 2-chloroethyl, and 5-bromopentyl as well as aromatic groups such as phenyl, tolyl, xylyl, chlorophenyl and nitrophenyl. In general, hydrocarbyl R and R' groups are preferred over corresponding substituted hydrocarbyl moieties and particularly preferred are R groups which are aromatic and R' groups which are aliphatic. The compound 3-methyl-1-phenylpyrazolin-5-one is a particularly preferred stabilizer for the compositions of the invention. The substituted pyrazolinone compounds are known compounds or are produced by known methods.

By way of specific example, the preferred 3-methyl-1-phenylpyrazolin-5-one is prepared by condensation of phenyl hydrazine and 3-ketobutyric acid.

The precise quantity of the substituted pyrazolinone compound employed in the compositions of the invention is not critical so long as a stabilizing quantity is present. Typical stabilizing quantities of the disubstituted pyrazoline compound are from about 0.005% by weight to about 5% by weight based on total stabilized composition. Quantities from about 0.01% by weight to about 1% by weight on the same basis are preferred. The pyrazolinone compound is added to the polyketone polymer by conventional methods suitable for forming an intimate mixture of the polymer and stabilizer. Such methods include the dry-blending of the polymer in a finely divided form and the stabilizer followed by hot pressing or extrusion of the mixture. Alternatively, the stabilized composition is formed in a mixing device operating at high shear. The stabilized compositions may also include other components such as antioxidants, other stabilizers, colorants, plasticizers, reinforcements and dyes which are added to the composition together with or separately from the substituted pyrazolinone compound.

The stabilized polyketone compositions are useful in the production of fibers, films, laminates, wire and cable and other shaped articles which are produced by methods conventional for the processing of thermoplastics, e.g., extrusion, thermoforming and injection molding. The compositions of the invention are particularly useful for production of shaped articles likely to be exposed to elevated temperatures, e.g., containers for food or drink, because of the heat stability imparted to the stabilized composition which results from the presence therein of the substituted pyrazolinone compound.

The invention is further illustrated by the following Illustrative Embodiments which should not be regarded as limiting.

ILLUSTRATIVE EMBODIMENT I

A linear alternating terpolymer of carbon monoxide, ethylene and propylene was produced in the presence of a catalyst composition formed from palladium acetate, trifluoroacetic acid and 1,3-bis[di(2-methoxyphenyl)phosphino]propane. The terpolymer had a melting point of 221° C. and a limiting viscosity number, measured in m-cresol at 60° C., of 1.85 dl/g.

ILLUSTRATIVE EMBODIMENT II

Sample plaques containing the terpolymer of Illustrative Embodiment I were prepared. The polymer contained 0.5% by weight of AO 330, a commercial antioxidant as co-stabilizer. The terpolymer was cryoground and dry-blended with 0.1% by weight and also with 0.5% by weight, each based on total composition, of 3-methyl-1-phenylpyrazolin-5-one. Each mixture was tumbled overnight and then extruded on a 15 mm Baker-Perkins twin screw extruder operating at a temperature of 240° C. The extruded composition was then used to make plaques of 0.03 inch thickness by a compression molding process. Also produced, as a control, were plaques having AO 330 but no 3-methyl-1-phenylpyrazolin-5-one.

The plaques were tested for long term heat stability by cutting the plaques into one centimeter wide strips and placing the strips in a forced air circulation oven operating at 125° C. Periodically, the strips were withdrawn from the oven and bent to a 180-degree angle. When the sample became sufficiently brittle to break under this test procedure it was considered to be in failure and the time to embrittlement was recorded. The results are shown in the Table.

TABLE

| Amount of 3-methyl-1-phenylpyrazolin-5-one, % wt | Days to Failure |
| --- | --- |
| None | 7.3 |
| 0.1 | 9.3 |
| 0.5 | 11.0 |

What is claimed is:

1. A stabilized composition comprising a linear alternating polymer of carbon monoxide and at least one ethylenically unsaturated hydrocarbon and incorporated therein a stabilizing quantity of a 1,3-disubstituted-pyrazolin-5-one.

2. The composition of claim 1 wherein the polymer is represented by the repeating formula

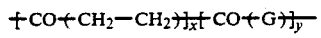

wherein G is the moiety of an ethylenically unsaturated hydrocarbon of at least 3 carbon atoms polymerized through the ethylenic unsaturation thereof and the ratio of y:x is no more than about 0.5.

3. The composition of claim 2 wherein the substituted pyrazolin-5-one is represented by the formula

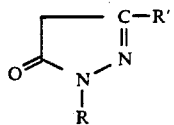

wherein R is aliphatic or aromatic of up to 10 carbon atoms inclusive and R' independently is R or hydrogen.

4. The composition of claim 3 wherein y is zero.

5. The composition of claim 4 wherein the substituted pyrazolin-5-one compound is 3-methyl-1-phenylpyrazolin-5-one.

6. The composition of claim 5 wherein the stabilizing quantity is from about 0.005% by weight to about 5% by weight based on total stabilized composition.

7. The composition of claim 3 wherein G is a moiety of propylene and the ratio of y:x is from about 0.01 to about 0.1.

8. The composition of claim 7 wherein R and R' independently are hydrocarbyl.

9. The composition of claim 8 wherein the substituted pyrazolin-5-one is 3-methyl-1-phenylpyrazolin-5-one.

10. The composition of claim 9 wherein the stabilizing quantity is from about 0.005% by weight to about 5% by weight based on total stabilized composition.

11. A process of stabilizing a linear alternating polymer of carbon monoxide and at least one ethylenically unsaturated hydrocarbon by incorporating therein a stabilizing quantity of a 1,3-disubstitutedpyrazolin-5-one.

12. The process of claim 11 wherein the polymer is represented by the repeating formula

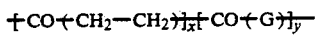

wherein G is the moiety of an ethylenically unsaturated hydrocarbon of at least 3 carbon atoms polymerized through the ethylenic unsaturation thereof and the ratio of y:x is no more than about 0.5.

13. The process of claim 12 wherein the substituted pyrazolin-5-one is represented by the formula

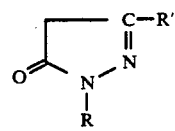

wherein R is aliphatic or aromatic of up to 10 carbon atoms inclusive and R' independently is R or hydrogen.

14. The process of claim 13 wherein y is zero.

15. The process of claim 14 wherein the substituted pyrazolin-5-one compound is 3-methyl-1-phenylpyrazolin-5-one.

16. The process of claim 15 wherein the stabilizing quantity is from about 0.005% by weight to about 5% by weight based on total stabilized composition.

17. The process of claim 13 wherein G is a moiety of propylene and the ratio of y:x is from about 0.01 to about 0.1.

18. The process of claim 17 wherein R and R' independently are hydrocarbyl.

19. The process of claim 18 wherein the substituted pyrazolin-5-one is 3-methyl-1-phenylpyrazolin-5-one.

20. The process of claim 19 wherein the stabilizing quantity is from about 0.005% by weight to about 5% by weight based on total stabilized composition.

* * * * *